United States Patent
Wang et al.

(10) Patent No.: US 11,635,892 B2
(45) Date of Patent: Apr. 25, 2023

(54) METHOD FOR DISPLAYING VIRTUAL KEYBOARD, VIRTUAL KEYBOARD AND DISPLAY DEVICE

(71) Applicant: BEIJING BAIDU NETCOM SCIENCE AND TECHNOLOGY CO., LTD., Beijing (CN)

(72) Inventors: Zhongyi Wang, Beijing (CN); Minhu Fan, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/223,413

(22) Filed: Apr. 6, 2021

(65) Prior Publication Data

US 2021/0286513 A1 Sep. 16, 2021

(30) Foreign Application Priority Data

May 25, 2020 (CN) .......................... 202010450907.3

(51) Int. Cl.
*G06F 3/04886* (2022.01)
*G06T 11/40* (2006.01)

(52) U.S. Cl.
CPC .......... *G06F 3/04886* (2013.01); *G06T 11/40* (2013.01)

(58) Field of Classification Search
CPC .............................. G06F 3/04886; G06T 11/40
See application file for complete search history.

(56) References Cited

U.S. PATENT DOCUMENTS

| | | | | |
|---|---|---|---|---|
| 10,248,438 B2* | 4/2019 | Nash | .................. | G06F 9/451 |
| 10,289,302 B1* | 5/2019 | Marsden | .................. | G06T 13/80 |
| 2010/0081476 A1* | 4/2010 | Markiewicz | ............ | G06F 3/167 |
| | | | | 345/169 |
| 2012/0113008 A1* | 5/2012 | Makinen | ............. | G06F 3/04883 |
| | | | | 345/168 |
| 2020/0064993 A1 | 2/2020 | Uebuchi | | |

FOREIGN PATENT DOCUMENTS

| | | |
|---|---|---|
| CN | 102687105 A | 9/2012 |
| CN | 206193750 U | 5/2017 |
| CN | 110764857 A | 2/2020 |
| CN | 110764858 A | 2/2020 |
| JP | 2011154561 A | 8/2011 |

(Continued)

OTHER PUBLICATIONS

Office Action for Chinese Application No. 202010450907.3, dated Apr. 20, 2021, 7 pages.

(Continued)

*Primary Examiner* — William L Bashore
*Assistant Examiner* — Gregory A Distefano
(74) *Attorney, Agent, or Firm* — Lippes Mathias LLP

(57) ABSTRACT

The present disclosure provides a method for displaying a virtual keyboard, a virtual keyboard and a display device, and relates to a technical field of virtual keyboards. The method includes: obtaining the virtual keyboard, the virtual keyboard including a plurality of virtual key areas and a light effect display area between and/or inside the plurality of virtual key areas; and displaying the plurality of virtual key areas of the virtual keyboard and performing a light effect display in the light effect display area.

10 Claims, 3 Drawing Sheets

(56) References Cited

FOREIGN PATENT DOCUMENTS

| | | | |
|---|---|---|---|
| JP | 2013115555 | A | 6/2013 |
| JP | 2014219965 | A | 11/2014 |
| JP | 2017045424 | A | 3/2017 |
| JP | 2020030761 | A | 2/2020 |
| JP | 2020034991 | A | 3/2020 |
| KR | 20170135223 | A | 12/2017 |
| WO | 2006047940 | A1 | 5/2006 |

OTHER PUBLICATIONS

Extended European Search Report for Application No. 21167097.1, dated Oct. 6, 2021, 7 pages.
Office Action for Japanese Application No. 2021-051622, dated Apr. 5, 2022, 3 pages.
Office Action for Korean Application No. 10-2021-0036778, dated Jul. 25, 2022, 6 pages.

* cited by examiner

METHOD FOR DISPLAYING VIRTUAL KEYBOARD, VIRTUAL KEYBOARD AND DISPLAY DEVICE

CROSS-REFERENCE TO RELATED APPLICATION

This application is based upon and claims priority to and benefits of Chinese Patent Application Serial No. 202010450907.3, filed on May 25, 2020, the entire content of which is incorporated herein by reference.

TECHNICAL FIELD

The present disclosure relates to a technical field of virtual keyboard in a technical field of electronic device, and in particular to, a method for displaying a virtual keyboard, a virtual keyboard and a display device.

BACKGROUND

With popularization of electronic devices, virtual keyboards are widely used on the electronic devices as main tools for inputting texts.

In order to meet personalized needs of users, the existing virtual keyboards provide personalized settings such as replacing keyboard skins and setting fonts.

SUMMARY

Embodiments of the disclosure provide a method for displaying a virtual keyboard. The method includes: obtaining the virtual keyboard, in which the virtual keyboard comprises a plurality of virtual key areas, and a light effect display area between and/or inside the plurality of virtual key areas; and displaying the plurality of virtual key areas of the virtual keyboard and performing a light effect display in the light effect display area.

Embodiments of the disclosure provide a virtual keyboard. The virtual keyboard includes: a plurality of virtual key areas, and a light effect display area locating between and/or inside the plurality of virtual key areas.

Embodiments of the disclosure provide an electronic device. The electronic device includes: at least one processor and a memory communicatively connected with the at least one processor. The memory stores instructions executable by the at least one processor, and the instructions are executed by the at least one processor, so that the at least one processor is capable to implement the method for displaying the virtual keyboard according to the above embodiments.

Embodiments of the disclosure provide a non-transitory computer-readable storage medium storing computer instructions, the computer instructions are configured to cause a computer to implement the method for displaying the virtual keyboard according to the embodiments of the first aspect.

An embodiment in the present disclosure has the following advantages or beneficial effects. After the virtual keyboard is acquired, the acquired virtual keyboard is divided into the plurality of virtual key areas and the light effect display to display the plurality of virtual key areas of the virtual keyboard, and perform light effect display in the light effect display area. Compared with the virtual keyboard in the related art having the problem of poor display effect due to a single style of the virtual keyboard, in the present disclosure, the virtual keyboard is divided into the virtual key areas and the light effect display area, thereby the dynamic light effect display of lights is implemented in the light effect display area, enriching the content displayed by the virtual keyboard.

It should be understood that the content described in this section is not intended to identify key or important features of the embodiments of the present disclosure, nor is it intended to limit the scope of the present disclosure. Additional features of the present disclosure will be easily understood based on the following description.

BRIEF DESCRIPTION OF THE DRAWINGS

The drawings are used to better understand the solution and do not constitute a limitation to the disclosure, in which.

DETAILED DESCRIPTION

The following describes the exemplary embodiments of the present disclosure with reference to the accompanying drawings, which includes various details of the embodiments of the present disclosure to facilitate understanding, which shall be considered merely exemplary. Therefore, those of ordinary skill in the art should recognize that various changes and modifications can be made to the embodiments described herein without departing from the scope and spirit of the present disclosure. For clarity and conciseness, descriptions of well-known functions and structures are omitted in the following description.

In order to meet personalized needs of users, the existing virtual keyboards provide personalized settings such as replacing keyboard skins and setting fonts. However, the existing virtual keyboards change the skin or set the font, which is executed on a designed whole virtual keyboard image, so the display form of the virtual keyboard still shows the set virtual keyboard image in a single way, causing the users to have the disadvantages of visual fatigue for long-term use. Thus, the present disclosure provides a method for displaying a virtual keyboard, a virtual keyboard, a display device, an electronic device and a storage medium.

A method for displaying a virtual keyboard, a virtual keyboard, a display device, an electronic device and a storage medium according to the embodiments of the present disclosure are described below with reference to the drawings.

Figure 1:
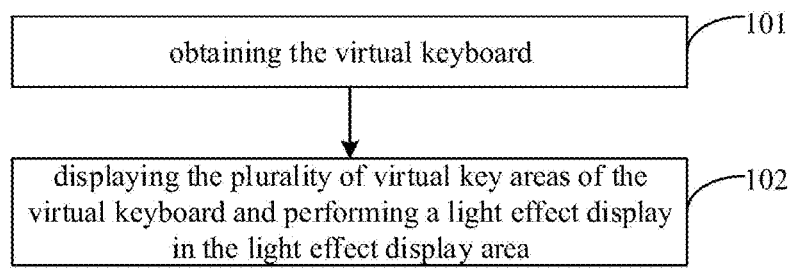
FIG. 1 is a flowchart of a method for displaying a virtual keyboard according to Embodiment 1 of the present disclosure.

FIG. 1 is a flowchart of a method for displaying a virtual keyboard according to Embodiment 1 of the present disclosure.

In this embodiment of the present disclosure, the method for displaying a virtual keyboard is configured in an apparatus for displaying a virtual keyboard. The apparatus for displaying a virtual keyboard may be applied to any electronic device, enabling the electronic device to implement a function of displaying a virtual keyboard.

The electronic device may be a Personal Computer (PC), a cloud device, a mobile device, and the like. The mobile device may be a hardware device having various operating systems and display/touch screens, such as a mobile phone, a tablet computer, a personal digital assistant, a wearable device and a vehicle-mounted device.

As illustrated in FIG. 1, the method for displaying a virtual keyboard includes the followings.

At block 101, a virtual keyboard is obtained.

The virtual keyboard includes a plurality of virtual key areas, and a light effect display area locating between and/or inside the plurality of virtual key areas.

For example, the virtual keyboard may be a keyboard that is simulated by software used when a user uses an input method. For example, the virtual keyboard may be a virtual keyboard displayed when an input method is used on a terminal device. At this time, the user may operate the virtual keyboard on the terminal device by touching a display screen. The virtual keyboard may also be a virtual keyboard displayed when an input method is used on the PC. At this time, the user may operate the virtual keyboard by clicking on the mouse, which is not limited herein.

In a possible implementation, virtual keys obtained when the user uses an input method may include a plurality of virtual key areas and a light effect display area locating between and inside the plurality of virtual key areas.

That is, the light effect display area is not only locates between the plurality of virtual keyboard areas, but also inside the plurality of virtual key areas.

The light effect display area may be used for light effect display. For example, the light effect display area may be provided with a plurality of light sources to perform light effect display by controlling the light sources. The light effect of each light source may be different at different time points, so that the light sources may be controlled to perform dynamic light effect display in the light effect display area.

For example, a plurality of RGB light sources may be arranged in the light effect display area, so as to realize dynamic light effect display in the light effect display area by controlling the plurality of RGB light sources.

A RGB light source integrates red, green, and blue colors into one light source, and lines corresponding to the three colors are arranged separately. Each color may be used independently or used in combination to generate any color, which may realize both individual control and simultaneous control, so that a variety of light effects may be displayed through one RGB light source.

Figure 2:
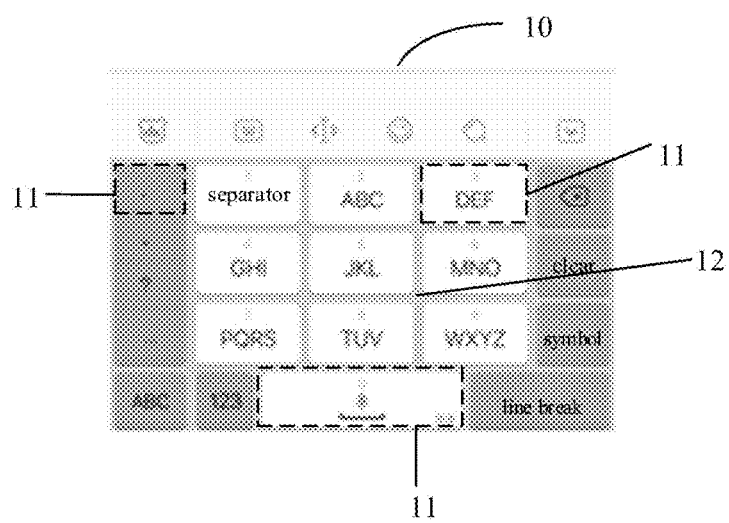
FIG. 2 is an example diagram of a virtual keyboard according to an embodiment of the present disclosure.

For example, the acquired virtual keyboard may be as shown in FIG. 2, the virtual keyboard 10 may include a plurality of virtual key areas 11 and a light effect display area 12.

It should be noted that the plurality of virtual key areas 11 and the light effect display area 12 shown in FIG. 2 are only an example, the light effect display area 12 not only locates between the plurality of virtual key areas 11, but also inside the plurality of virtual key area 11.

In another possible implementation, the virtual keys acquired when the user uses an input method may also include a plurality of virtual key areas and a light effect display area locating between the plurality of virtual key areas.

That is, in this case, the light effect display area of the virtual keyboard only locates between the plurality of virtual key areas.

For example, as illustrated in FIG. 2, the light effect display area 12 only locates between the plurality of virtual key areas 11, and does not locate inside the plurality of virtual key areas 11.

In another possible implementation, the virtual keys acquired when the user uses an input method may also include a plurality of virtual key areas and a light effect display area locating inside the plurality of virtual key areas.

That is, in this case, the light effect display area of the virtual keyboard only locates inside the plurality of virtual key areas.

At block 102, the plurality of virtual key areas of the virtual keyboard are displayed and a light effect display is performed in the light effect display area.

In some embodiments of the present disclosure, after the virtual keyboard is acquired, the plurality of virtual key areas of the virtual keyboard may be displayed on a display screen of the electronic device, and a dynamic light effect display may be performed in the light effect display area.

For example, a virtual keyboard as shown in FIG. 2 is obtained, when the light effect display area locates between the plurality of virtual key areas, the plurality of virtual key areas included in the virtual keyboard may be displayed on the display screen of the electronic device, and the plurality of light sources may be controlled to perform dynamic light effect display in the light effect display area locating between the plurality of virtual key areas.

Alternatively, when the light effect display area not only locates between the plurality of virtual key areas, but also inside the plurality of virtual key areas, the plurality of virtual key areas included in the virtual keyboard may be displayed on the display screen of the electronic device, and the plurality of light sources may be controlled to perform dynamic light effect display in the light effect display area between and inside the plurality of virtual key areas.

Figure 3:
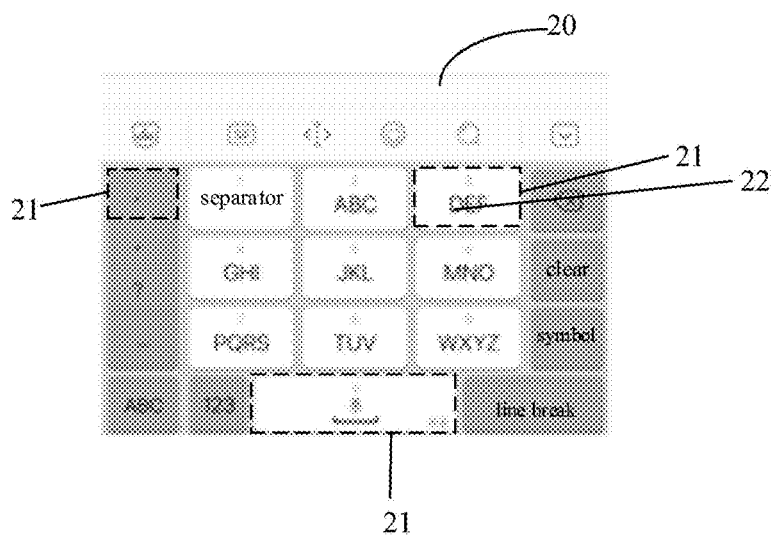
FIG. 3 is an example diagram of another virtual keyboard according to an embodiment of the present disclosure.

For example, the acquired virtual keyboard may be as shown in FIG. 3, the virtual keyboard 20 may include a plurality of virtual key areas 21 and a light effect display area 22 locating inside the plurality of virtual key areas 21.

After the virtual keyboard as shown in FIG. 3 is obtained, the plurality of virtual key areas included in the virtual keyboard may be displayed on the display screen of the electronic device, and the plurality of light sources may be controlled to display a dynamic light effect in the light effect display area locating inside the plurality of virtual key areas.

Understandably, the light effect display area may be provided with a plurality of light sources, and by controlling on/off of the plurality of light sources, hybrid special effects of multiple lights may be realized, so as to realize the dynamic light effect display of the plurality of lights in the light effect display area.

It should be noted that, FIGS. 2 and 3 only illustrate position relationships between the virtual key areas and the light effect display area, which do not limit the light effect display of the virtual keyboard. Further, as the light effect display area may include the areas between any two adjacent virtual key areas, and/or inside a light effect display area, the light effect display area is not shown in a block.

With the method for displaying the virtual keyboard of the embodiments of the present disclosure, after the virtual keyboard is acquired, the acquired virtual keyboard is divided into the plurality of virtual key areas and the light effect display to display the plurality of virtual key areas of the virtual keyboard, and perform light effect display in the light effect display area. Compared with the virtual keyboard in the related art having the problem of poor display effect due to a single style of the virtual keyboard, in the present disclosure, the virtual keyboard is divided into the virtual key areas and the light effect display area, thereby the dynamic light effect display of lights is implemented in the light effect display area, enriching the content displayed by the virtual keyboard.

In a possible implementation, the virtual keyboard may include a keyboard layer and a light effect layer. When the virtual keyboard is obtained, the virtual keyboard may be obtained by obtaining the keyboard layer and the light effect layer, and then the obtained virtual keyboard is displayed. The above process will be described in detail in the context of FIG. 4, FIG. 4 is a flowchart of a method for displaying a virtual keyboard according to Embodiment 2 of the present disclosure.

Figure 4:
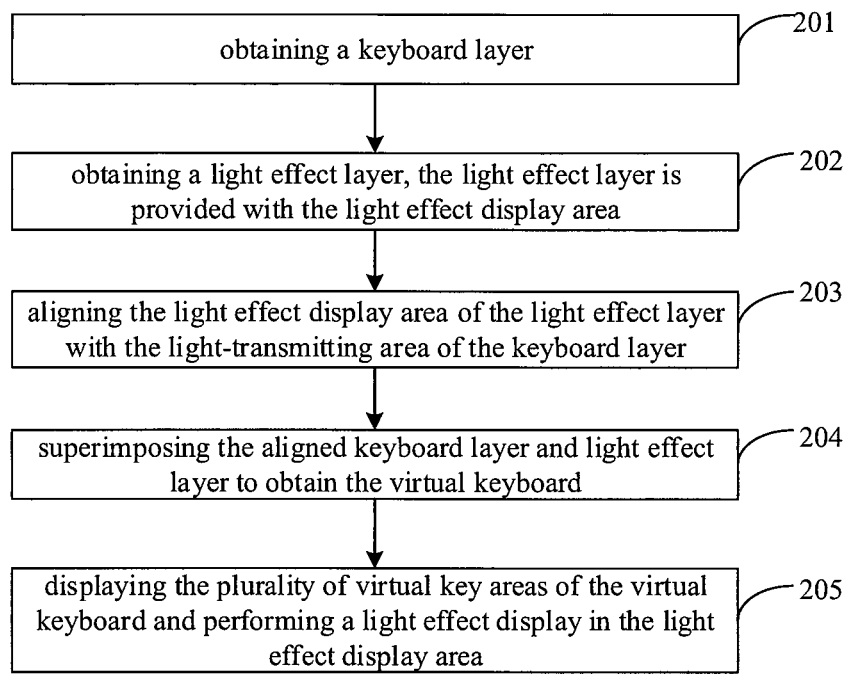
FIG. 4 is a flowchart of a method for displaying a virtual keyboard according to Embodiment 2 of the present disclosure.

As illustrated in FIG. 4, the method for displaying a virtual keyboard includes the following.

At block 201, a virtual keyboard is obtained.

The keyboard layer may be provided with a plurality of virtual key areas. A light-transmitting area is set between and/or inside the plurality of virtual key areas.

Layers are like films containing elements such as text or graphics, which are stacked one by one in order to form a final effect of a page. Layers may accurately position elements on the page.

In a possible implementation, the keyboard layer may be provided with the plurality of virtual key areas, and the light-transmitting area is provided between the plurality of virtual key areas, so that the lights emitted by the light source may pass through the light-transmitting area between the plurality of virtual key areas and be presented.

In another possible implementation, the keyboard layer may be provided with the plurality of virtual key areas, and the light-transmitting area is provided inside the plurality of virtual key areas.

In another possible implementation, the keyboard layer may be provided with the plurality of virtual key areas, and the light-transmitting area is not only provided between the plurality of virtual key areas, but also inside the plurality of virtual key areas.

At block 202, a light effect layer is obtained, the light effect layer is provided with the light effect display area.

In the present disclosure, light effect display may be performed through the light effect display area set in the light effect layer.

In a possible implementation, a preset color at each time point is determined according to user requirements, and then, a first sub-layer presenting the preset color in the light effect display area is generated according to the preset color. Thus, by displaying different preset colors in the light effect display area at different time points, a dynamic light effect display is realized and the content of the light effect display is enriched. For example, when there are 5 preset colors, first sub-layers corresponding to the 5 preset colors may be generated in the light effect display area.

Further, a light effect attribute at each time point is acquired to configure light effects of a plurality of light sources at each time point according to the corresponding light effect attribute at the time point, so that each light source performs the light effect display according to the its configured light effect at each time point, thereby realizing a mixed special light effect, a gorgeous degree of the display effect of the multiple light sources is far greater than that of the single layer display effect. The light effect attribute includes one or more of a radius of an irradiation range, a light source brightness, brightness attenuation information within the irradiation range, and a light source color temperature. The first sub-layer may also be called a sub-layer of color.

According to the plurality of light sources, a second sub-layer presenting a plurality of light sources in the light effect display area is generated, the first sub-layer and the second sub-layer are superimposed to obtain the light effect layer. The second sub-layer may also be called a sub-layer of light source.

It should be noted that the order in which the first sub-layer and the second sub-layer are superimposed is not limited, and different orders of superposition correspond to different light effect layers.

It should be noted that the execution order of the above steps at blocks 201 and 202 is not limited, and the step at block 202 may be performed first, and then the step at block 201 is performed. Alternatively, the steps at blocks 201 and 202 may be performed at the same time, which is not limited in the present disclosure.

At block 203, the light effect display area of the light effect layer is aligned with the light-transmitting area of the keyboard layer.

In some embodiments of the present disclosure, after obtaining the keyboard layer provided with the plurality of virtual key areas and the light-transmitting area, and the light effect layer provided with the light effect display area, the light effect display area of the light effect layer may be aligned with the light-transmitting area of the keyboard layer, so that the light effect displayed in the light effect display area is presented through the light-transmitting area, thus the user may intuitively see the display effect of the dynamic light effect of the virtual keyboard.

In a possible implementation, when the light-transmitting area is arranged between the plurality of virtual key areas of the keyboard layer, the light effect display area of the light effect layer may be aligned with the light-transmitting area between the plurality of virtual key areas of the keyboard layer, so that the light source set between the plurality of virtual key areas may perform dynamic light effect display through the light-transmitting area.

In another possible implementation, when the light-transmitting area is arranged inside the plurality of virtual key areas of the keyboard layer, the light effect display area of the light effect layer may be aligned with the light-transmitting area inside the plurality of virtual key areas of the keyboard layer, so that the light sources arranged inside the plurality of virtual key areas may present dynamic light effects through the light-transmitting area.

In yet another possible implementation, when the light-transmitting area is arranged not only between but also inside the plurality of virtual key areas of the keyboard layer, the light effect display area of the light effect layer may be aligned with the light-transmitting area between and inside the plurality of virtual key areas of the keyboard layer, so that the light sources arranged between and inside the plurality of virtual key areas may present dynamic light effects through the light-transmitting area.

It should be noted that the above different alignment methods correspond to different dynamic light effect display effects, the user may determine which method to use for alignment according to the position of the light-transmitting area set on the keyboard layer, which is not limited.

In addition, the arrangement order when aligning the keyboard layer and the light effect layer is adjustable. For example, the keyboard layer may locates above the light effect layer, or the light effect layer may locates above the keyboard layer. Different arrangement orders correspond to different light effect display effects, and the user can set different arrangement orders according to his/her own needs, which is not limited here.

At block 204, the aligned keyboard layer and light effect layer are superimposed to obtain the virtual keyboard.

In some embodiments of the present disclosure, after the light effect display area of the light effect layer is aligned with the light transmission area of the keyboard layer, the aligned keyboard layer and light effect layer may be superimposed to obtain the virtual keyboard.

At block 205, the plurality of virtual key areas of the virtual keyboard are displayed and a light effect display is performed in the light effect display area.

In the embodiments of the present disclosure, the implementation process at block 205 may refer to the implementation process to block 102 in the above embodiment, which is not repeated here.

With the method for displaying the virtual keyboard according to the embodiments of the present disclosure, after obtaining the keyboard layer and the light effect layer, the light effect display area of the light effect layer is aligned with the light-transmitting area of the keyboard layer, the aligned keyboard layer and light effect layer are superimposed to obtain the virtual keyboard, the plurality of virtual key areas of the virtual keyboard are displayed, and the light effect display is performed in the light effect display area. Therefore, the light effect display area of the light effect layer and the light-transmitting area of the keyboard layer are aligned by using different alignment methods to obtain the virtual keyboard with different light effect display effects, and then dynamic light effect display may be performed in the light effect display area of the virtual keyboard, which enriches the content displayed in the virtual keyboard.

In order to implement the method for displaying the virtual keyboard according to the above embodiment, the present disclosure provides a virtual keyboard.

Figure 5:
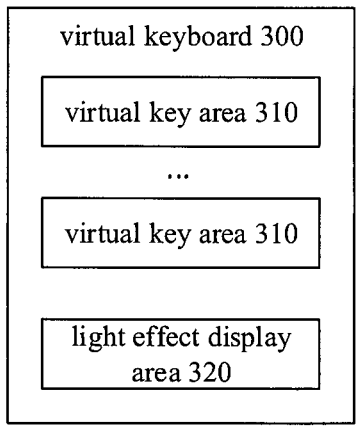
FIG. 5 is a schematic diagram of a virtual keyboard according to Embodiment 3 of the present disclosure.

FIG. 5 is a schematic diagram of a virtual keyboard according to Embodiment 3 of the present disclosure.

As illustrated in FIG. 5, the virtual keyboard 300 includes a plurality of virtual key areas 310, and a light effect display area 320.

The light effect display area 320 is configured to perform light effect display. The light effect display area 320 locating between the plurality of virtual key areas 310, or locating inside the plurality of virtual key areas 310, or locating not only between but also inside the plurality of virtual key areas 310, which is not limited here.

Optionally, a plurality of light sources may be provided in the light effect display area 320, to perform light effect display according to light effect attributes at each time point by controlling the plurality of light sources. The light effect attributes of each light source may be different at different time points, so that the light sources may be controlled to perform dynamic light effect display in the light effect display area.

For example, a plurality of RGB light sources may be arranged in the light effect display area 310. The RGB light sources integrate red, green, and blue colors into one light source, and the three lines corresponding to the three colors are arranged separately. Each color is may be used independently or used in combination to make any color, which may realize both individual control and simultaneous control, and displays a variety of light effects through the RGB light source.

The light effect attributes may include one or more of a radius of an irradiation range, a light source brightness, brightness attenuation information within the irradiation range, and a light source color temperature.

As a possible implementation, in the light effect display area 320, at least one light source may be provided at a corner point of each virtual key. Alternatively, at least one light source may be provided at an edge of each virtual key. Alternatively, at least one light source may be provided both at the corner and the edge of each virtual key.

In the embodiments of the present disclosure, in the light effect display area, when the at least one light source is respectively provided at the corner and/or the edge of each virtual key, at least one light source may be provided at a center of each virtual key at the same time. In this disclosure, users may set light sources in the light effect display area 320 according to their own needs, to achieve the purpose of personalized display of dynamic light effects.

Figure 6:
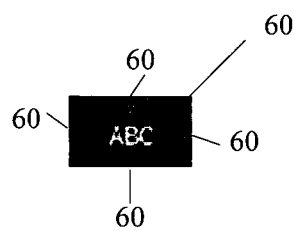
FIG. 6 is an example diagram of a virtual keyboard according to an embodiment of the present disclosure.

For example, as illustrated in FIG. 6, a total of five light sources 60 may be provided at the four edges and the center position of the virtual key.

In an embodiment, the color presented by the light effect display area 320 may be configured to change over time. That is, the light source set in the light effect display area 320 may perform light effect display at different time points according to the preset colors, thereby realizing that the light effect display area 320 displays different light effects at different time points to achieve dynamic light effect.

The virtual keyboard of the embodiments of the present disclosure includes the plurality of virtual key areas and the light effect display area locating between and/or inside the plurality of virtual key areas. By displaying dynamic light effects in the light effect display area, the contents displayed in the virtual keyboard display are enriched.

In order to implement the method for displaying the virtual keyboard of the above embodiments, the present disclosure provides an apparatus for displaying the virtual keyboard.

Figure 7:
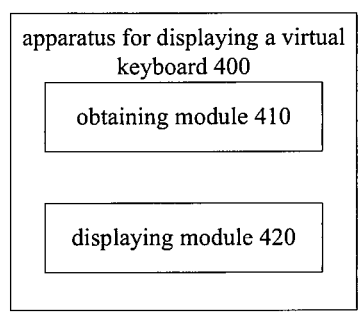
FIG. 7 is a schematic diagram of an apparatus for displaying a virtual keyboard according to Embodiment 4 of the present disclosure.

FIG. 7 is a schematic diagram of an apparatus for displaying a virtual keyboard according to Embodiment 4 of the present disclosure.

As illustrated in FIG. 7, the apparatus 400 for displaying the virtual keyboard includes: an obtaining module 410 and a displaying module 420.

The obtaining module 410 is configured to obtain the virtual keyboard, the virtual keyboard includes a plurality of virtual key areas, and a light effect display area locating between and/or inside the plurality of virtual key areas.

The displaying module 420 is configured to display the plurality of virtual key areas of the virtual keyboard, and perform a light effect display in the light effect display area.

In a possible embodiment, the obtaining module 410 includes: a first obtaining unit, a second obtaining unit, an aligning unit and a superimposing unit.

The first obtaining unit is configured to obtain a keyboard layer, the keyboard layer is provided with the plurality of virtual key areas, and a light-transmitting area is provided between and/or inside the plurality of virtual key areas.

The second obtaining unit is configured to obtain a light effect layer provided with the light effect display area.

The aligning unit is configured to align the light effect display area of the light effect layer with the light-transmitting area of the keyboard layer.

The superimposing unit is configured to superimpose the aligned keyboard layer and the light effect layer to obtain the virtual keyboard.

In a possible embodiment, the second obtaining unit is further configured to: generate a first sub-layer presenting a preset color in the light effect display area based on the preset color; generate a second sub-layer that presenting a plurality of light sources in the light effect display area based on the plurality of light sources; and superimpose the first sub-layer and the second sub-layer to obtain the light effect layer.

In a possible embodiment, the second obtaining unit is further configured to: obtain a light effect attribute at each time point; configure light effects of the plurality of light sources at each time point based on the light effect attribute at each time point. The light effect attribute includes one or more of a radius of an irradiation range, a light source brightness, brightness attenuation information within the irradiation range, and a light source color temperature.

In a possible embodiment, the second obtaining unit is further configured to determine the preset color at each time point.

With the apparatus for displaying a virtual keyboard of the embodiments of the present disclosure, after obtaining the virtual keyboard, the acquired virtual keyboard is divided into the plurality of virtual key areas, and the light effect display to display the plurality of virtual key areas of the virtual keyboard, and light effect display is performed in the light effect display area. Compared with the virtual keyboard in the related art having the problem of poor display effect due to a single style of the virtual keyboard, in the present disclosure, the virtual keyboard is divided into the virtual key areas and the light effect display area, thereby realizing the dynamic light effect display of lights in the light effect display area, and enriching the content displayed by the virtual keyboard.

According to the embodiments of the present disclosure, the disclosure also provides an electronic device and a computer-readable storage medium.

Figure 8:
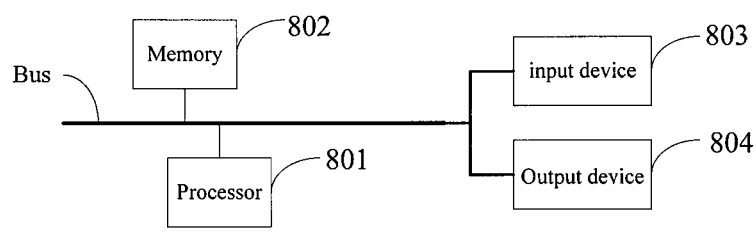
FIG. 8 is a block diagram of an electronic device used to implement a method for displaying a virtual keyboard according to an embodiment of the present disclosure.

FIG. 8 is a block diagram of an electronic device used to implement the method for displaying a virtual keyboard according to an embodiment of the present disclosure. Electronic devices are intended to represent various forms of digital computers, such as laptop computers, desktop computers, workbenches, personal digital assistants, servers, blade servers, mainframe computers, and other suitable computers. Electronic devices may also represent various forms of mobile devices, such as personal digital processing, cellular phones, smart phones, wearable devices, and other similar computing devices. The components shown here, their connections and relations, and their functions are merely examples, and are not intended to limit the implementation of the disclosure described and/or required herein.

As illustrated in FIG. 8, the electronic device includes: one or more processors 801, a memory 802, and interfaces for connecting various components, including a high-speed interface and a low-speed interface. The various components are interconnected using different buses and can be mounted on a common mainboard or otherwise installed as required. The processor may process instructions executed within the electronic device, including instructions stored in or on the memory to display graphical information of the GUI on an external input/output device such as a display device coupled to the interface. In other embodiments, a plurality of processors and/or buses can be used with a plurality of memories and processors, if desired. Similarly, a plurality of electronic devices can be connected, each providing some of the necessary operations (for example, as a server array, a group of blade servers, or a multiprocessor system). A processor 801 is taken as an example in FIG. 8.

The memory 802 is a non-transitory computer-readable storage medium according to the disclosure. The memory stores instructions executable by at least one processor, so that the at least one processor executes the method for displaying a virtual keyboard according to the disclosure. The non-transitory computer-readable storage medium of the disclosure stores computer instructions, which are used to cause a computer to execute the method for displaying a virtual keyboard according to the disclosure.

As a non-transitory computer-readable storage medium, the memory 802 is configured to store non-transitory software programs, non-transitory computer executable programs and modules, such as program instructions/modules (for example, the obtaining module 410 and the displaying module 420 shown in FIG. 7) corresponding to the method in the embodiment of the present disclosure. The processor 801 executes various functional applications and data processing of the server by running non-transitory software programs, instructions, and modules stored in the memory 802, that is, implementing the method in the foregoing method embodiments.

The memory 802 may include a storage program area and a storage data area, where the storage program area may store an operating system and application programs required for at least one function. The storage data area may store data created according to the use of the electronic device for implementing the method. In addition, the memory 802 may include a high-speed random access memory, and a non-transitory memory, such as at least one magnetic disk storage device, a flash memory device, or other non-transitory solid-state storage device. In some embodiments, the memory 802 may optionally include a memory remotely disposed with respect to the processor 801, and these remote memories may be connected to the electronic device for implementing the method through a network. Examples of the above network include, but are not limited to, the Internet, an intranet, a local area network, a mobile communication network, and combinations thereof.

The electronic device for implementing the method may further include: an input device 803 and an output device 804. The processor 801, the memory 802, the input device 803, and the output device 804 may be connected through a bus or in other manners. In FIG. 8, the connection through the bus is taken as an example.

The input device 803 may receive inputted numeric or character information, and generate key signal inputs related to user settings and function control of an electronic device for implementing the method, such as a touch screen, a keypad, a mouse, a trackpad, a touchpad, an indication rod, one or more mouse buttons, trackballs, joysticks and other input devices. The output device 804 may include a display device, an auxiliary lighting device (for example, an LED), a haptic feedback device (for example, a vibration motor), and the like. The display device may include, but is not limited to, a liquid crystal display (LCD), a light emitting diode (LED) display, and a plasma display. In some embodiments, the display device may be a touch screen.

Various embodiments of the systems and technologies described herein may be implemented in digital electronic circuit systems, integrated circuit systems, application specific integrated circuits (ASICs), computer hardware, firmware, software, and/or combinations thereof. These various embodiments may be implemented in one or more computer programs, which may be executed and/or interpreted on a programmable system including at least one programmable processor. The programmable processor may be dedicated or general purpose programmable processor that receives data and instructions from a storage system, at least one input device, and at least one output device, and transmits the data and instructions to the storage system, the at least one input device, and the at least one output device.

These computing programs (also known as programs, software, software applications, or code) include machine instructions of a programmable processor and may utilize high-level processes and/or object-oriented programming languages, and/or assembly/machine languages to implement these calculation procedures. As used herein, the terms "machine-readable medium" and "computer-readable medium" refer to any computer program product, device, and/or device used to provide machine instructions and/or data to a programmable processor (for example, magnetic disks, optical disks, memories, programmable logic devices (PLDs), including machine-readable media that receive machine instructions as machine-readable signals. The term "machine-readable signal" refers to any signal used to provide machine instructions and/or data to a programmable processor.

In order to provide interaction with a user, the systems and techniques described herein may be implemented on a computer having a display device (e.g., a Cathode Ray Tube (CRT) or a Liquid Crystal Display (LCD) monitor for displaying information to a user); and a keyboard and pointing device (such as a mouse or trackball) through which the user can provide input to the computer. Other kinds of devices may also be used to provide interaction with the user. For example, the feedback provided to the user may be any form of sensory feedback (e.g., visual feedback, auditory feedback, or haptic feedback), and the input from the user may be received in any form (including acoustic input, sound input, or tactile input).

The systems and technologies described herein can be implemented in a computing system that includes background components (for example, a data server), or a computing system that includes middleware components (for example, an application server), or a computing system that includes front-end components (For example, a user computer with a graphical user interface or a web browser, through which the user can interact with the implementation of the systems and technologies described herein), or include such background components, intermediate computing components, or any combination of front-end components. The components of the system may be interconnected by any form or medium of digital data communication (e.g., a communication network). Examples of communication networks include: local area network (LAN), wide area network (WAN), and the Internet.

The computer system may include a client and a server. The client and server are generally remote from each other and interacting through a communication network. The client-server relation is generated by computer programs running on the respective computers and having a client-server relation with each other.

According to the technical solution of the embodiments of the present disclosure, after the virtual keyboard is acquired, the acquired virtual keyboard is divided into the plurality of virtual key areas and the light effect display area. The plurality of virtual key areas of the virtual keyboard are displayed, and the light effect display is performed in the light effect display area. Compared with the virtual keyboard in the related art having the problem of poor display effect due to a single style of the virtual keyboard, In this disclosure, the virtual keyboard is divided into the virtual key areas and the light effect display area, thereby realizing the dynamic light effect display of lights in the light effect display area, and enriching the contents displayed by the virtual keyboard.

It should be understood that the various forms of processes shown above can be used to reorder, add or delete steps. For example, the steps described in the disclosure could be performed in parallel, sequentially, or in a different order, as long as the desired result of the technical solution disclosed in the disclosure is achieved, which is not limited herein.

The above specific embodiments do not constitute a limitation on the protection scope of the present disclosure. Those skilled in the art should understand that various modifications, combinations, sub-combinations and substitutions can be made according to design requirements and other factors. Any modification, equivalent replacement and improvement made within the spirit and principle of this application shall be included in the protection scope of this application.

What is claimed is:

1. A method for displaying a virtual keyboard, comprising:
    obtaining the virtual keyboard, wherein the virtual keyboard comprises a plurality of virtual key areas and a light effect display area between and/or inside the plurality of virtual key areas; and
    displaying the plurality of virtual key areas of the virtual keyboard and performing a light effect display in the light effect display area,
    wherein obtaining the virtual keyboard comprises:
    obtaining a keyboard layer, wherein the keyboard layer is provided with the plurality of virtual key areas, and a light-transmitting area is provided between and/or inside the plurality of virtual key areas;
    obtaining a light effect layer, wherein the light effect layer is provided with the light effect display area;
    aligning the light effect display area of the light effect layer with the light-transmitting area of the keyboard layer according to the position of the light-transmitting area set on the keyboard layer, wherein different alignments correspond to different dynamic light effect display effects; and
    superimposing the aligned keyboard layer and the light effect layer to obtain the virtual keyboard.

2. The method according to claim 1, wherein obtaining the light effect layer comprises:
    generating a first sub-layer presenting a preset color in the light effect display area based on the preset color;
    generating a second sub-layer presenting a plurality of light sources in the light effect display area based on the plurality of light sources; and
    superimposing the first sub-layer and the second sub-layer to obtain the light effect layer.

3. The method according to claim 2, wherein before generating the second sub-layer presenting the plurality of light sources in the light effect display area based on the plurality of light sources, the method further comprises:
    obtaining a light effect attribute at each time point;
    configuring light effects of the plurality of light sources at each time point based on the light effect attribute at each time point; wherein
    the light effect attribute comprises one or more of a radius of an irradiation range, a light source brightness, brightness attenuation information within the irradiation range, and a light source color temperature.

4. The method according to claim 2, wherein before generating the first sub-layer presenting the preset color in the light effect display area based on the preset color, the method further comprises:

determining the preset color at each time point.

5. The method according to claim 4, wherein performing the light effect display in the light effect display area comprises:

controlling a color presented in the light effect display area to change with time.

6. An electronic device, comprising:

at least one processor; and a memory communicatively connected with the at least one processor; wherein, the memory stores instructions executable by the at least one processor, and the instructions are executed by the at least one processor, so that the at least one processor is capable to implement a method for displaying the virtual keyboard, the method comprising:

obtaining the virtual keyboard, wherein the virtual keyboard comprises a plurality of virtual key areas and a light effect display area between and/or inside the plurality of virtual key areas; and displaying the plurality of virtual key areas of the virtual keyboard and performing a light effect display in the light effect display area, wherein obtaining the virtual keyboard comprises:

obtaining a keyboard layer, wherein the keyboard layer is provided with the plurality of virtual key areas, and a light-transmitting area is provided between and/or inside the plurality of virtual key areas;

obtaining a light effect layer, wherein the light effect layer is provided with the light effect display area;

aligning the light effect display area of the light effect layer with the light-transmitting area of the keyboard layer according to the position of the light-transmitting area set on the keyboard layer, wherein different alignments correspond to different dynamic light effect display effects; and superimposing the aligned keyboard layer and the light effect layer to obtain the virtual keyboard.

7. The electronic device according to claim 6, wherein obtaining the light effect layer comprises:

generating a first sub-layer presenting a preset color in the light effect display area based on the preset color;

generating a second sub-layer presenting a plurality of light sources in the light effect display area based on the plurality of light sources; and superimposing the first sub-layer and the second sub-layer to obtain the light effect layer.

8. The electronic device according to claim 7, wherein before generating the second sub-layer presenting the plurality of light sources in the light effect display area based on the plurality of light sources, the method further comprises:

obtaining a light effect attribute at each time point;

configuring light effects of the plurality of light sources at each time point based on the light effect attribute at each time point; wherein the light effect attribute comprises one or more of a radius of an irradiation range, a light source brightness, brightness attenuation information within the irradiation range, and a light source color temperature.

9. The electronic device according to claim 7, wherein before generating the first sub-layer presenting the preset color in the light effect display area based on the preset color, the method further comprises:

determining the preset color at each time point.

10. The electronic device according to claim 9, wherein performing the light effect display in the light effect display area comprises:

controlling a color presented in the light effect display area to change with time.

* * * * *